United States Patent
Shetty et al.

(10) Patent No.: US 11,288,056 B1
(45) Date of Patent: Mar. 29, 2022

(54) SYSTEM AND METHOD FOR VERIFYING HARDWARE COMPLIANCE

(71) Applicant: DELL PRODUCTS, LP, Round Rock, TX (US)

(72) Inventors: Sudhir Shetty, Cedar Park, TX (US); Raveendra Babu Madala, Bangalore (IN); Santosh Gore, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 9 days.

(21) Appl. No.: 17/028,468

(22) Filed: Sep. 22, 2020

(51) Int. Cl.
*G06F 8/65* (2018.01)

(52) U.S. Cl.
CPC ...................................... *G06F 8/65* (2013.01)

(58) Field of Classification Search
USPC ........................................................ 717/169
See application file for complete search history.

(56) References Cited

U.S. PATENT DOCUMENTS

| | | | | | |
|---|---|---|---|---|---|
| 2011/0029493 | A1* | 2/2011 | Yin | ...................... | G06Q 10/10 707/694 |
| 2012/0011083 | A1* | 1/2012 | Storms | ..................... | G06N 5/02 706/12 |
| 2012/0204171 | A1* | 8/2012 | Reisman | ................. | H04L 67/00 717/172 |
| 2012/0239522 | A1* | 9/2012 | Swanson | ............ | G06Q 30/0643 705/26.5 |
| 2019/0250897 | A1 | 8/2019 | Gore et al. | | |
| 2020/0117439 | A1 | 4/2020 | Jose et al. | | |
| 2020/0142682 | A1* | 5/2020 | Marks | ....................... | G06F 8/65 |
| 2020/0142683 | A1* | 5/2020 | Rao | ........................ | G06F 9/4411 |
| 2021/0208864 | A1* | 7/2021 | Berlandier | ................ | G06F 8/73 |

OTHER PUBLICATIONS

H. Ludwig et al.; "Catalog-Based Service Request Management"; IBM Systems Journal (vol. 46, No. 3, pp. 1-18); 2007 (Year: 2007).*

* cited by examiner

*Primary Examiner* — Qing Chen
*Assistant Examiner* — Clint Thatcher
(74) *Attorney, Agent, or Firm* — Larson Newman, LLP

(57) ABSTRACT

An information handling system includes a memory to store one or more solution catalogs for systems within the information handling system, and a processor. The processor fetches the one or more solution catalogs for the systems within the information handling system. The processor further combines specified update packages to create one or more revised solution catalogs. The processor also builds a map of an existing solution catalog with the components being managed with the existing solution catalog. Based on an associated one of the revised solution catalogs, the processor determines compliance for each of the solution catalogs.

20 Claims, 5 Drawing Sheets

SYSTEM AND METHOD FOR VERIFYING HARDWARE COMPLIANCE

FIELD OF THE DISCLOSURE

The present disclosure generally relates to information handling systems, and more particularly relates to verifying hardware compliance in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory to store one or more solution catalogs for systems within the information handling system. A processor may fetch the solution catalogs for the systems within the information handling system. The processor may further combine specified update packages to create one or more revised solution catalogs. The processor also may build a map of an existing solution catalog with the components being managed with the existing solution catalog. Based on an associated one of the revised solution catalogs, the processor may compute compliance for each of the solution catalogs.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
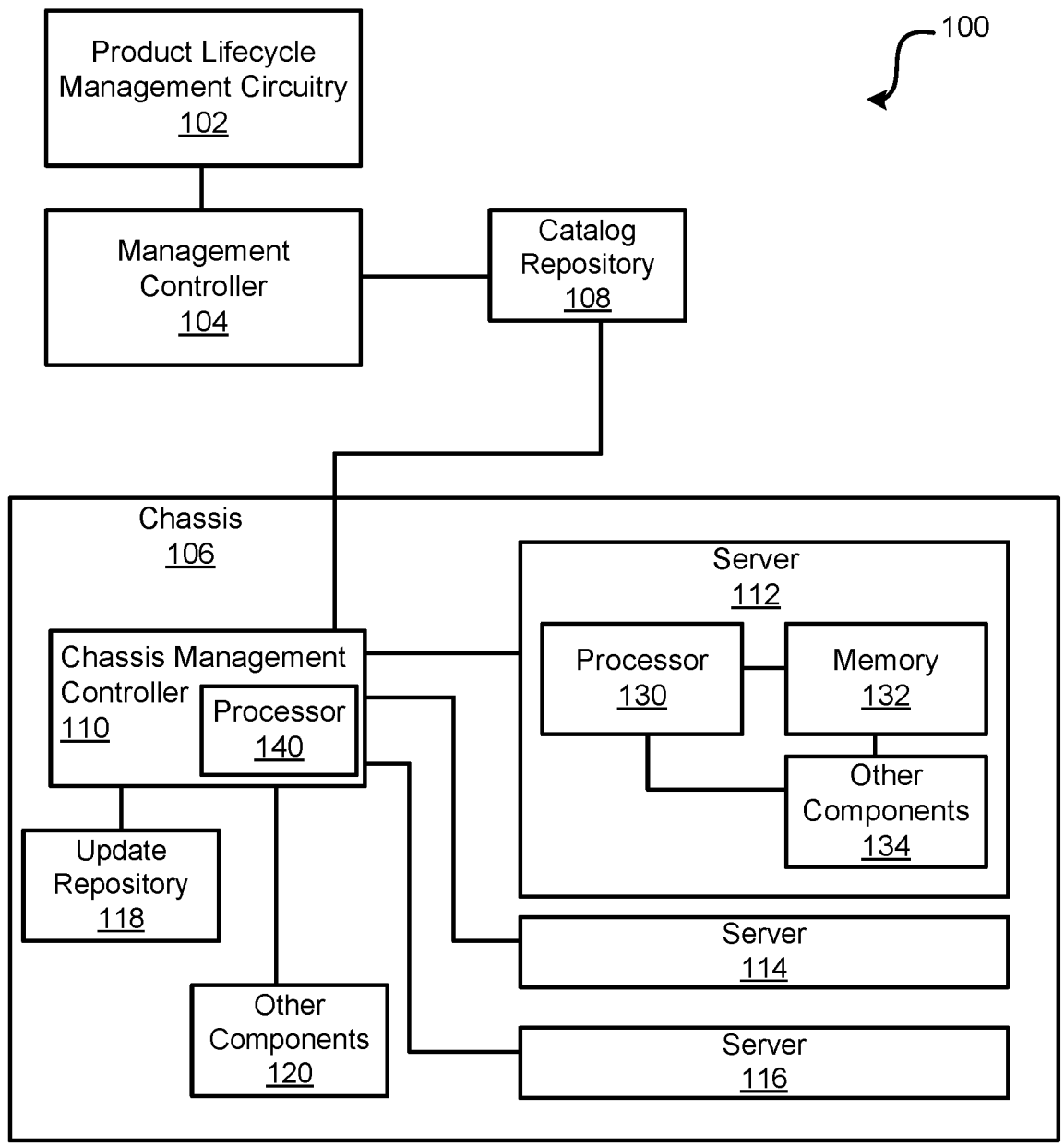
FIG. 1 is a block diagram of a portion of an information handling system according to at least one embodiment of the disclosure.

FIG. 1 shows a portion of an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 includes product lifecycle management circuitry 102, management controller 104, a chassis 106, and a catalog repository 108. Chassis 106 includes a chassis management controller 110, servers 112, 114, and 116, an update repository 118, and other components 120. Each of servers 112, 114, and 116 includes multiple components, such as a processor 130, a memory 132, and other components 134 of server 112 shown in FIG. 1. Product lifecycle management circuitry 102 may communicate with management controller 104, which in turn communicates with catalog repository 108. Chassis management controller 110 communicates with catalog repository 108, with servers 112, 114, and 116, and with update repository 118. In an example, catalog repository 108 and update repository 118 may both be a memory accessible by chassis management controller 118, and the repositories may store any suitable information or data for information handling system 100 including, but not limited to, solution catalogs and update catalogs. In an example, chassis management controller 110 includes a processor 140 to execute one or more applications including, but not limited to, a system management console, an Open Manage Enterprise (OME), OpenManage Integration (OMI) for VMware vCenter (also referred to as Spectre) is a highly complex management application suite for System Management, which are integrated with chassis management controller 110, or a baseboard management controller, such as an Integrated Dell Remote Access Controller (iDRAC), LifeCycle Controller (LC), OpenManage Server Administrator (OMSA), VMware vSphere Client, and Web Client. Chassis management controller 110 may be referred to as a system management controller without varying from the scope of this disclosure. In certain examples, information handling system 100 may include additional components over those shown in FIG. 1 without varying from the scope of this disclosure.

In an example, chassis management controller 110 may have its own processor, memory, network connection, and access to the system bus. Integrated into the motherboard of a server, chassis management controller 110 may provide out-of-band management facilities that allow administrators to deploy, monitor, manage, configure, update, troubleshoot and remediate the server from any location, and without the use of agents. Chassis management controller 110 is known to provide remote access controllers with a management application suite which enhance certain system management functionality of the remote access controller.

During operation, product lifecycle management circuitry 102 may determine any suitable updates for the servers 112, 114, and 116. For example, the updates may include, but are not limited to, firmware updates, device software updates, application updates, and operating environment updates. Product lifecycle management circuitry 102 may initiate the updates be published to a website for access by servers 112, 114, and 116 by providing an indication to management controller 104, which in turn can publish the update to catalog repository 108. Chassis management controller 110 may then access catalog repository 108 and download an update package for the update. Chassis management controller 110 may then store the update package to update repository 118 for later update in servers 112, 114, and 116.

In an example, chassis 106 may include several solutions including, but not limited to, vSAN, VXRail, Microsoft Exchange, SAP, and HANA. Different solutions may be executed by one or more of servers 112, 114, and 116. Each solution may have specific firmware, driver, and operating environment requirements. In certain examples, catalog repository 108 may also include solution specific catalogs, which chassis management controller 110 may download and store in update repository 118. In an example, the solution catalog may take time to reflect the latest update packages. If information handling system 100 is a data center environment, chassis management controller 110 may evaluate compliance between particular solution requirements and updates received from catalog repository 108.

Previous information handling systems were not able to easily and/or automatically compute the compliance of specific update packages while determining a solution baseline. In these previous information handling systems there is not a way to analysis update packages to collect information to determine whether a particular update package matches certain criteria for a solution within the information handling system. In an example, evaluations of update package compliance with certain criteria may be difficult in previous information handling systems. Information handling system 100 may be improved by chassis management controller 110 performing automatic compliance verification between updates in the update package and solution requirements in a solution catalog. This improvement to information handling system 100 may enable proper updates to be installed within servers 112, 114, and 116.

During operation, processor 140 of chassis/system management controller 110 may execute OME to perform one or more suitable operations to provide an automatic compliance computation for updates to components within servers 112, 114, and 116 of information handling system 100. For example, processor 140 may execute an update management plug-in of OME to facilitate a user specifying a desired update package. In an example, a solution or solution catalog within a particular server, such as server 112, 114, or 116, may only have one update package for an updateable component within that solution or catalog.

Chassis management controller 110 may receive an update catalog from catalog repository 108 and store the update catalog in update repository 118. In response to the storing the update catalog in update repository 118, chassis management controller 110, via processor 140, may fetch all solution catalogs in use for the systems managed by the chassis management controller. In an example, the systems managed by chassis management controller 110 may include, but is not limited to, systems or solutions executed by servers 112, 114, and 116.

In an example, chassis management controller 110 may dynamically create revised solution catalogs by combining specified update packages. Chassis management controller 110 may combine the specified update packages in any suitable manner including, but not limited to, adhering to catalog constraints contained within the solution catalog. In an example, chassis management controller 110 may create one or more catalogs for components of servers 112, 114, and 116 by combining specific update packages with solution specific update catalogs. The combining of the specified update package will be described in more detail with respect to FIG. 2.

Figure 2:
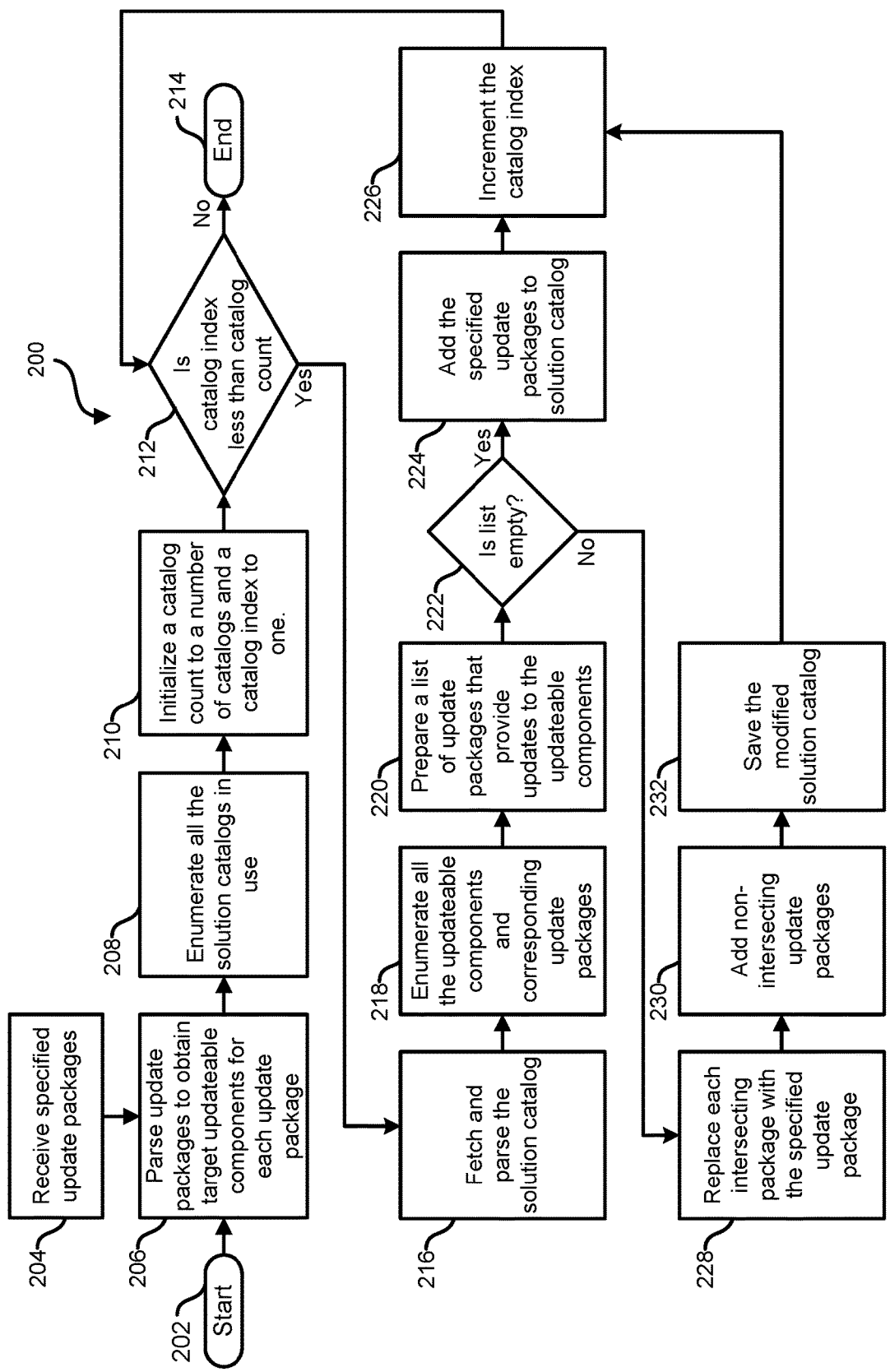
FIG. 2 is a flow diagram of a method for combining update packages to create a revised solution catalog according to at least one embodiment of the present disclosure.

FIG. 2 shows a flow diagram of a method 200 for combining update packages to create a revised solution catalog according to at least one embodiment of the present disclosure, starting at block 202. It will be readily appreciated that not every method step set forth in this flow diagram is always necessary, and that certain steps of the methods may be combined, performed simultaneously, in a different order, or perhaps omitted, without varying from the scope of the disclosure. FIG. 2 may be employed in whole, or in part, by information handling system 100 depicted in FIG. 1 or any other type of system, controller, device, module, processor, or any combination thereof, operable to employ all, or portions of, the method of FIG. 2.

At block 204, specified update packages are received. In an example, the update packages may be received by a chassis management controller of an information handling system, and may be received from any suitable source. For example, the chassis management controller may receive the update packages from a catalog repository.

At block 206, the update packages are parsed to obtain information about target updateable components for each update package. In an example, the updateable components may be any suitable components within information handling system 100, such as one or more components of servers 112, 114, and 116. In certain examples, if the chassis management controller, such as chassis management controller 110 of FIG. 1, is not able to parse the update packages, the chassis management controller may obtain the target updateable component information from a user of the information handling system. In an example, a processor of a chassis management controller may execute the OME and may fetch all solution catalogs in use of the information handling system. In certain examples, the operations of blocks 208-232 may be performed for each solution catalog in use within information handling system.

At block 208, all solution catalogs in use are enumerated. In an example, each solution catalog in use may be associated with a different solution executed in servers 112, 114, and 116. A solution catalog may include information associated with a particular solution. For example, a solution catalog may indicate specific firmware, drivers and operating environment requirements.

At block 210, a catalog count is initialized to a number of catalogs and a catalog index is initialized to zero. In an example, the number of catalogs may be the number of solution catalogs in the information handling system. For example, each solution of the information handling system may have its own solution catalog.

At block 212, a determination is made whether the catalog index is less than the catalog count. If the catalog index is not less than the catalog count, the flow ends at block 214. Otherwise, if the catalog index is less than the catalog count, the solution catalog is fetched and parsed at block 216. In an example, a chassis management controller may examine the solution catalog to determine whether it contains any updates for updateable components addressed by a specified update package. At block 218, all updateable components and corresponding update packages are enumerated.

At block 220, a list of update packages is prepared. In an example, the list may include the update packages that provide updates to the updateable components. At block 222, a determination is made whether the list is empty. If the list is empty, the specified update packages are added to the solution catalog at block 224. At block 226, the catalog index is incremented, and the flow continues as stated above at block 212.

If the list is not empty, each intersecting update package with the specified update package at block 228. In an example, the intersecting packages may be any suitable number of update packages that include different updates for the same particular updateable component of a solution. In certain examples, a particular solution may require a particular update. At block 230, non-intersecting update packages are added to the specified update package. At block 232, the modified solution catalog is saved, and the flow continues at block 226.

Referring back to FIG. 1, chassis management controller 110 may one or more operations to complete the compliance computation. For example, chassis management controller 110 may build a map of an existing solution catalog with the systems of information handling system 100 being managed by that catalog. In an example, for each solution catalog, processor 140 of chassis management controller 110 may execute the OME to compute or determine the compliance based on the revised solution catalog as discussed in greater detail with respect to FIG. 3.

Figure 3:
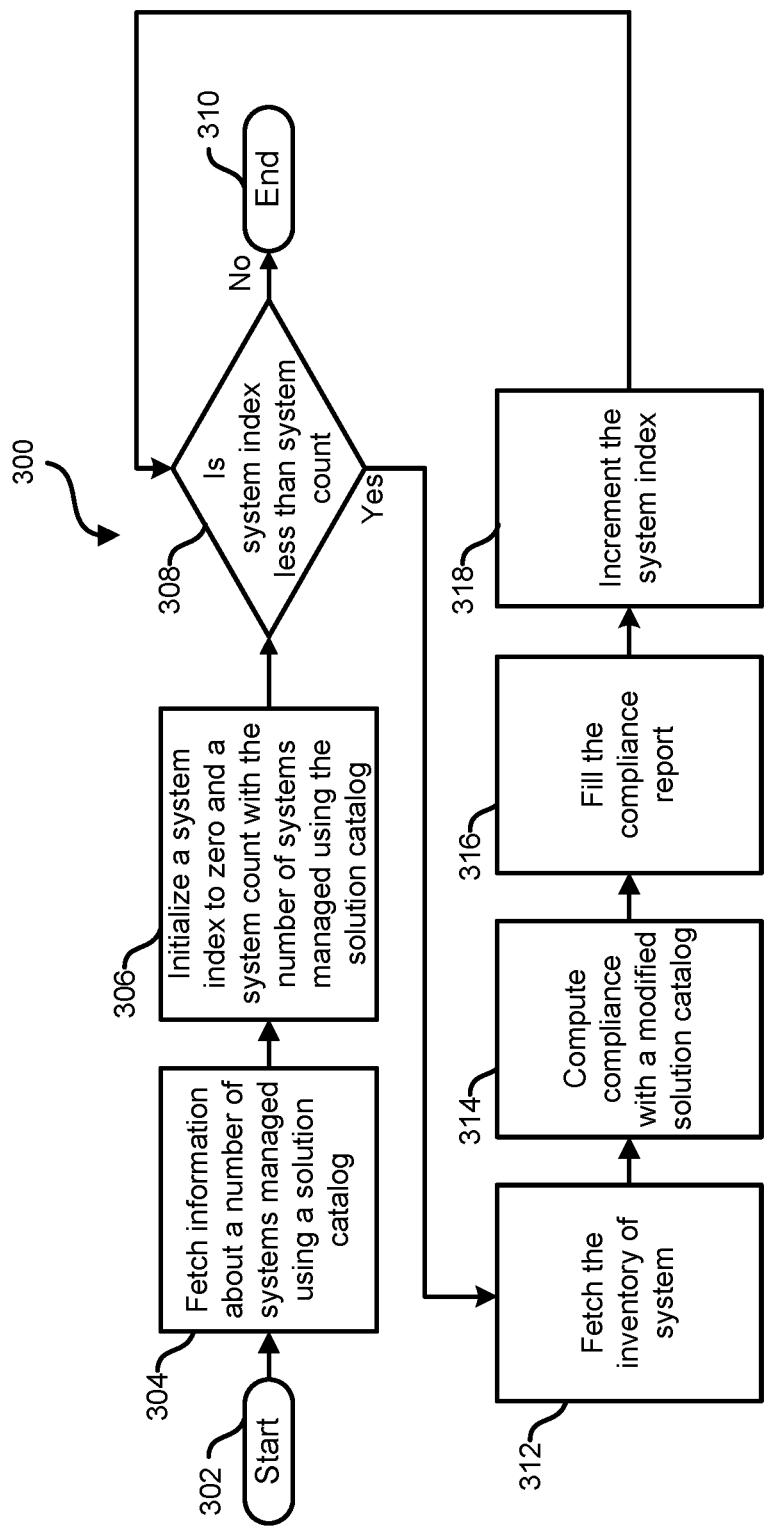
FIG. 3 is a flow diagram of a method for computing compliance based on the revised solution catalog according to at least one embodiment of the present disclosure.

FIG. 3 shows a flow diagram of a method 300 for computing compliance based on the revised solution catalog according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1 or any other type of system, controller, device, module, processor, or any combination thereof, operable to employ all, or portions of, the method of FIG. 3.

At block 304, information about a number of systems managed by a solution catalog is fetched. At block 306, a system index is initialized to zero and a system count is initialized with the number of systems managed using the solution catalog. At block 308, a determination is made whether the system index is less than the system count. If the system index is not less than the system count, the flow ends at block 310.

If the system index is less than the system count, the inventory of the system is fetched at block 312. At block 314, compliance with a modified solution catalog is computed. At block 316, a compliance report is filled. At block 318, the system index is incremented, and the flow continues at stated above at block 308.

Figure 4:
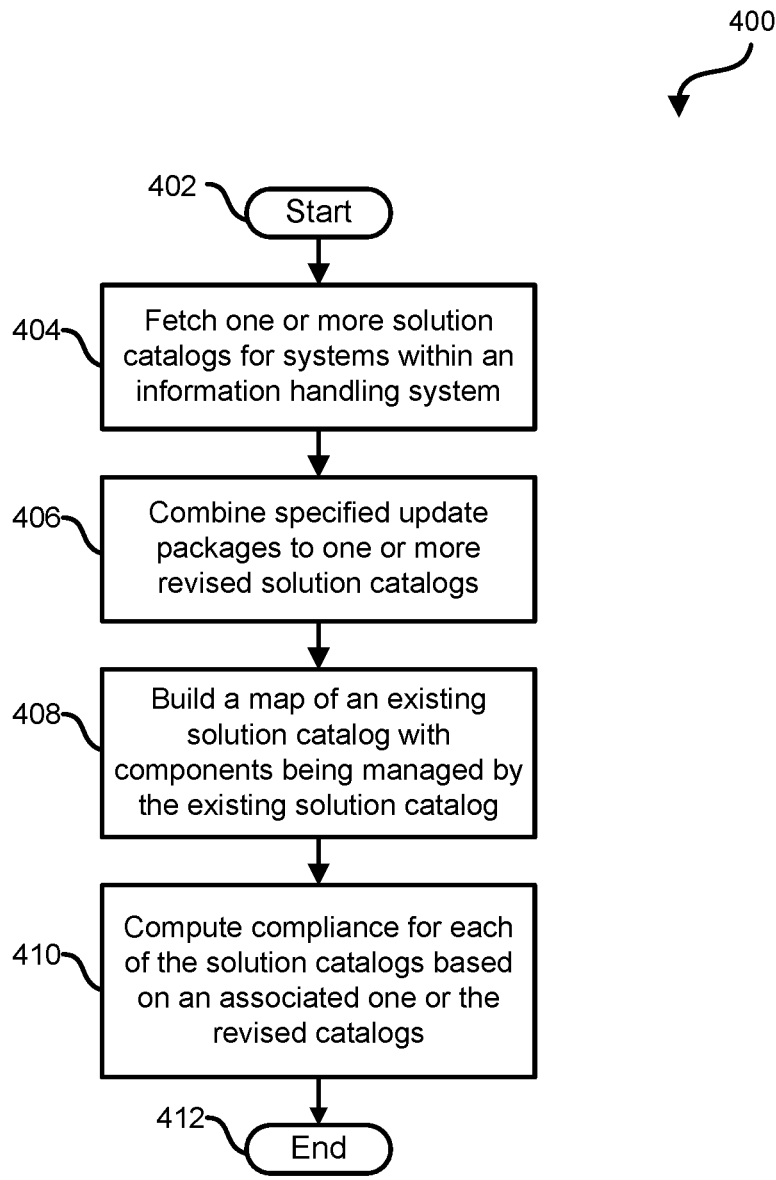
FIG. 4 is a flow diagram of a method for computing compliance of updates in an information handling system according to at least one embodiment of the present disclosure.

FIG. 4 shoes a flow diagram of a method 400 for computing compliance of updates in an information handling system according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1 or any other type of system, controller, device, module, processor, or any combination thereof, operable to employ all, or portions of, the method of FIG. 4.

At block 404, one or more solution catalogs for systems within an information handling system are fetched. In an example, any suitable device or component within the information handling system including, but not limited to, a system management controller. At block 406, specified update packages are combined to create one or more revised solution catalogs. In an example, the combining of the specified update packages may be performed in any suitable manner including, but not limited to, each of the update packages being parsed to obtain information for each updateable component within the each of the update packages At block 408, a map of an existing solution catalog is built with the components being managed by the existing solution catalog. At block 410, compliance of updates is computed with respect to updateable components of each of the solution catalogs based on an associated one of the revised solution catalogs, and the flow ends at block 412.

Referring back to FIG. 1, processor 140 may execute the OME to perform one or more of the operations described above to automatically compute compliance of update packages while maintaining solution specific baselines for systems executed by servers 112, 114, and 116. Processor 140 may also compute when update packages are available and ensure the compliance computation is performed with respect to different contexts of the different solutions within information handling system 100. Processor 140 may perform one or more of the operations to improve chassis management controller 110 and information handling system 100.

Figure 5:
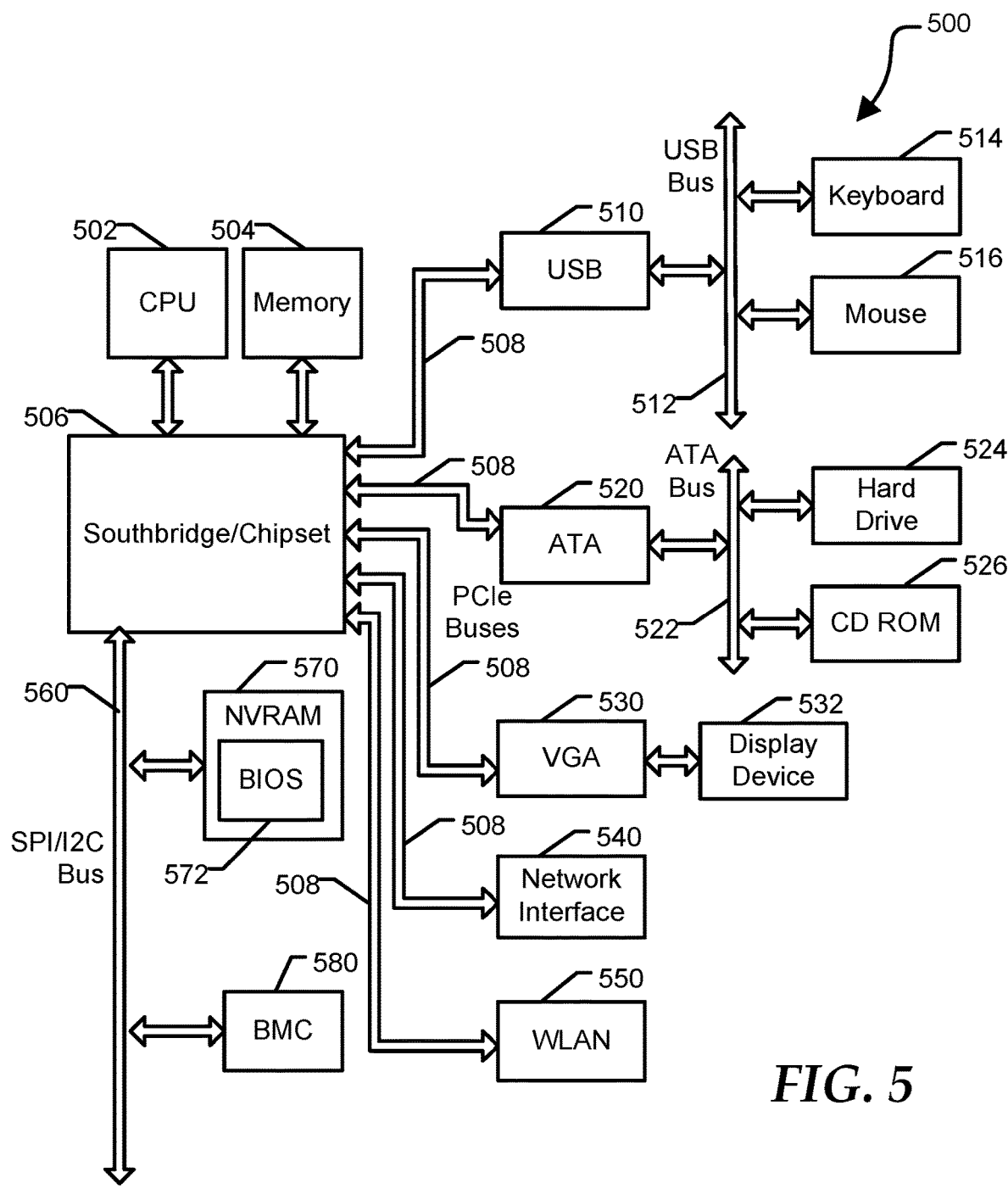
FIG. 5 is a block diagram of a general information handling system according to an embodiment of the present disclosure.

FIG. 5 illustrates a general information handling system 500 including a processor 502, a memory 504, a southbridge/chipset 506, one or more PCIe buses 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. In an example, chipset 506 may be directly connected to an individual end point via a PCIe root port within the chipset and a point-to-point topology as shown in FIG. 5. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of southbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 500 may be any suitable device including, but not limited to, information handling system 100 and servers 112, 114, and 116 of FIG. 1. Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
fetching, by a system management controller in an information handling system, one or more solution catalogs for systems within the information handling system;
combining specified update packages to create one or more revised solution catalogs;
building a map of an existing solution catalog with the components being managed by the existing solution catalog; and
determining compliance of updates to updateable components for each of the solution catalogs based on an associated one of the revised solution catalogs.

2. The method of claim 1, wherein the combining of the specified update packages to create one or more revised solution catalogs further comprises:
parsing each of the update packages to obtain information for each updateable component within the each of the update packages.

3. The method of claim 2, further comprising:
parsing a first solution catalog for a first system of the systems;
determining whether the first solution catalog contains any updates for the updateable components addressed by the specified update packages;
determining one or more intersecting update packages, wherein each of the intersecting update packages includes more than one update for a first updateable component;
replacing each interesting update package with the specified update package;
adding update packages that do not interest to the specified update package; and
saving the revised solution catalog.

4. The method of claim 1, wherein the combining of the specified update packages to create one or more revised solution catalogs further comprises:
determining that one of the update packages cannot be parsed; and
based on the one of the update packages not being able to be parsed, obtaining information for each updateable component within the specified update packages from a user of the information handling system.

5. The method of claim 1, the determining of compliance for each of the solution catalogs based on the associated one of the revised solution catalogs further comprises:
fetching information about the systems managed using the specified solution catalog, wherein the information includes a number of systems managed using the solution catalog;
fetching the revised solution catalog;
fetching inventory for the first system; and
determining compliance with the revised solution catalog.

6. The method of claim 5, further comprising:
completing a compliance report based on the determining of the compliance.

7. The method of claim 6, wherein the method further comprises:
in response to the completing the compliance report, incrementing the system index.

8. The method of claim 5, wherein prior to fetching the inventory for the first system, the method comprises:
initializing a system index to zero;
initializing a system count to the number of systems managed using the solution catalog; and
determining that the system index is less than the system count.

9. An information handling system comprising:
a memory to store one or more solution catalogs for systems within the information handling system; and
a processor to communicate with the memory, the processor to:
fetch the solution catalogs for the systems within the information handling system;
combine specified update packages to create one or more revised solution catalogs;

build a map of an existing solution catalog with the components being managed by the existing solution catalog; and determine compliance of updates to updateable components for each of the solution catalogs based on an associated one of the revised solution catalogs.

10. The information handling system of claim 9, wherein the combining of the specified update packages to create one or more revised solution catalogs, the processor further to:

parse each of the update packages to obtain information for each updateable component within the each of the update packages.

11. The information handling system of claim 10, the processor further to:

parse a first solution catalog for a first system of the systems;

determine whether the first solution catalog contains any updates for the updateable components addressed by the specified update packages;

determine one or more intersecting update packages, wherein each of the intersecting update packages includes more than one update for a first updateable component;

replace each interesting update package with the specified update package;

add update packages that do not interest to the specified update package; and save the revised solution catalog.

12. The information handling system of claim 9, the determining of compliance for each of the solution catalogs based on the associated one of the revised solution catalogs, the processor further to:

fetch information about the systems managed using the specified solution catalog, wherein the information includes a number of systems managed using the solution catalog;

fetch the revised solution catalog;

fetch inventory for the first system; and determine compliance with the revised solution catalog.

13. The information handling system of claim 12, wherein the processor further to complete a compliance report based on the determining of the compliance.

14. The information handling system of claim 13, wherein in response to the completing the compliance report, the processor further to increment the system index.

15. The information handling system of claim 12, wherein prior to fetching the inventory for the first system, the processor further to:

initialize a system index to zero;

initialize a system count to the number of systems managed using the solution catalog; and determine that the system index is less than the system count.

16. A non-transitory computer-readable medium including code that when executed by a processor performs a method, the method comprising:

fetching one or more solution catalogs for systems within an information handling system;

combining specified update packages to create one or more revised solution catalogs;

building a map of an existing solution catalog with the components being managed by the existing solution catalog; and determining compliance of updates to updateable components for each of the solution catalogs based on an associated one of the revised solution catalogs.

17. The non-transitory computer-readable medium of claim 16, wherein the combining of the specified update packages to create one or more revised solution catalogs further includes:

parsing each of the update packages to obtain information for each updateable component within the each of the update packages.

18. The non-transitory computer-readable medium of claim 17, wherein the method further comprises:

parsing a first solution catalog for a first system of the systems;

determining whether the first solution catalog contains any updates for the updateable components addressed by the specified update packages;

determining one or more intersecting update packages, wherein each of the intersecting update packages includes more than one update for a first updateable component;

replacing each interesting update package with the specified update package;

adding update packages that do not interest to the specified update package; and saving the revised solution catalog.

19. The non-transitory computer-readable medium of claim 16, the determining of compliance for each of the solution catalogs based on the associated one of the revised solution catalogs further includes:

fetching information about the systems managed using the specified solution catalog, wherein the information includes a number of systems managed using the solution catalog;

fetching the revised solution catalog;

fetching inventory for the first system; and determining compliance with the revised solution catalog.

20. The non-transitory computer-readable medium of claim 19, wherein prior to fetching the inventory for the first system, the method comprises:

initializing a system index to zero;

initializing a system count to the number of systems managed using the solution catalog; and determining that the system index is less than the system count.

* * * * *